(12) United States Patent
Hattori et al.

(10) Patent No.: US 11,063,483 B2
(45) Date of Patent: Jul. 13, 2021

(54) ELECTRIC MOTOR

(71) Applicant: TOYOTA JIDOSHA KABUSHIKI KAISHA, Toyota (JP)

(72) Inventors: Hiroyuki Hattori, Okazaki (JP); Takeshi Kitayama, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/513,786

(22) Filed: Jul. 17, 2019

(65) Prior Publication Data

US 2020/0044496 A1 Feb. 6, 2020

(30) Foreign Application Priority Data

Aug. 3, 2018 (JP) ............................. JP2018-147150

(51) Int. Cl.
*H02K 1/14* (2006.01)
*H02K 21/12* (2006.01)
*H02K 1/27* (2006.01)

(52) U.S. Cl.
CPC ........... *H02K 1/148* (2013.01); *H02K 1/2706* (2013.01); *H02K 21/12* (2013.01); *H02K 2201/03* (2013.01)

(58) Field of Classification Search
CPC ......... H02K 21/04; H02K 1/278; H02K 19/26
USPC ............. 310/156.54, 181, 190, 216.001, 263
See application file for complete search history.

(56) References Cited

U.S. PATENT DOCUMENTS

| | | | | |
|---|---|---|---|---|
| 2,802,959 A * | 8/1957 | Powers | ................ | H02K 21/046 310/156.66 |
| 3,283,191 A * | 11/1966 | Carruth | ................ | H02K 19/24 310/168 |
| 3,555,327 A * | 1/1971 | Terry | ....................... | H02K 5/15 310/168 |
| 3,648,087 A * | 3/1972 | Kitamura | ............. | H02K 49/043 310/93 |
| 3,656,017 A * | 4/1972 | Inagaki | .................. | H02K 19/24 310/90 |
| 5,952,756 A * | 9/1999 | Hsu | ........................ | H02K 15/03 310/112 |
| 2002/0047448 A1* | 4/2002 | Kawamura | .............. | B60K 6/26 310/181 |

(Continued)

FOREIGN PATENT DOCUMENTS

CN 104104163 B 3/2017
JP 2010-068596 A 3/2010
(Continued)

*Primary Examiner* — Jose A Gonzalez Quinones
(74) *Attorney, Agent, or Firm* — Oliff PLC

(57) ABSTRACT

An electric motor includes: a rotary shaft member rotating about an axis; a rotor including a rotor core, which has an annular shape and is provided on the rotary shaft member, and a magnet provided on the rotor core; a stator including a stator core, which has an annular shape and is disposed at an interval from the rotor core in a radial direction that is a direction orthogonal to an axial direction of the rotary shaft member, and a stator coil wound around the stator core; a field yoke, which has an annular shape, includes the rotor and the staorm, and has a fixed relative positional relationship with the stator core; and a case member, which has a side wall extending in the axial direction to face an outer peripheral surface of the field yoke, the field yoke being fixed to the case member.

6 Claims, 3 Drawing Sheets

(56) References Cited

U.S. PATENT DOCUMENTS

| | | | |
|---|---|---|---|
| 2012/0223600 A1* | 9/2012 | Tonogi | ............... H02K 1/148 |
| | | | 310/46 |
| 2014/0300245 A1 | 10/2014 | Ohashi et al. | |
| 2015/0076940 A1 | 3/2015 | Ohashi et al. | |

FOREIGN PATENT DOCUMENTS

| | | |
|---|---|---|
| JP | 2012-182945 A | 9/2012 |
| JP | 2015-089173 A | 5/2015 |
| JP | 2015-100194 A | 5/2015 |

* cited by examiner

ELECTRIC MOTOR

CROSS-REFERENCE TO RELATED APPLICATION(S)

The present application claims priority to and incorporates by reference the entire contents of Japanese Patent Application No. 2018-147150 filed in Japan on Aug. 3, 2018.

BACKGROUND

The present disclosure relates to an electric motor.

In Japanese Laid-open Patent publication No. 2012-182945, there is disclosed an electric motor that includes a rotor having an annular rotor core provided on a shaft, a stator having an annular stator core disposed with a space in a radial direction with respect to the rotor core, and a cylindrical field yoke involving the rotor and the stator. In this electric motor, the outer peripheral portion of the stator core is press-fitted to the inner peripheral portion of the field yoke, thereby fixing the stator core to the field yoke.

However, in the electric motor disclosed in Japanese Laid-open Patent Publication No. 2012-182945, a force such as a torque reaction force is directly applied from the outer peripheral portion of the stator core to the inner peripheral portion of the field yoke during operation of the electric motor, whereby the field yoke may be deformed.

SUMMARY

There is a need for providing an electric motor capable of preventing a deformation of a field yoke.

According to an embodiment, an electric motor includes: a rotary shaft member rotating about an axis; a rotor including a rotor core, which has an annular shape and is provided on the rotary shaft member, and a magnet provided on the rotor core; a stator including a stator core, which has an annular shape and is disposed at an interval from the rotor core in a radial direction that is a direction orthogonal to an axial direction of the rotary shaft member, and a stator coil wound around the stator core; a field yoke, which has an annular shape, includes the rotor and the staorm, and has a fixed relative positional relationship with the stator core; and a case member, which has a side wall extending in the axial direction to face an outer peripheral surface of the field yoke, the field yoke being fixed to the case member.

DETAILED DESCRIPTION

Hereinafter, embodiments of an electric motor according to the present disclosure will be described. Note that the present disclosure is not limited to those present embodiments.

First Embodiment

Figure 1:
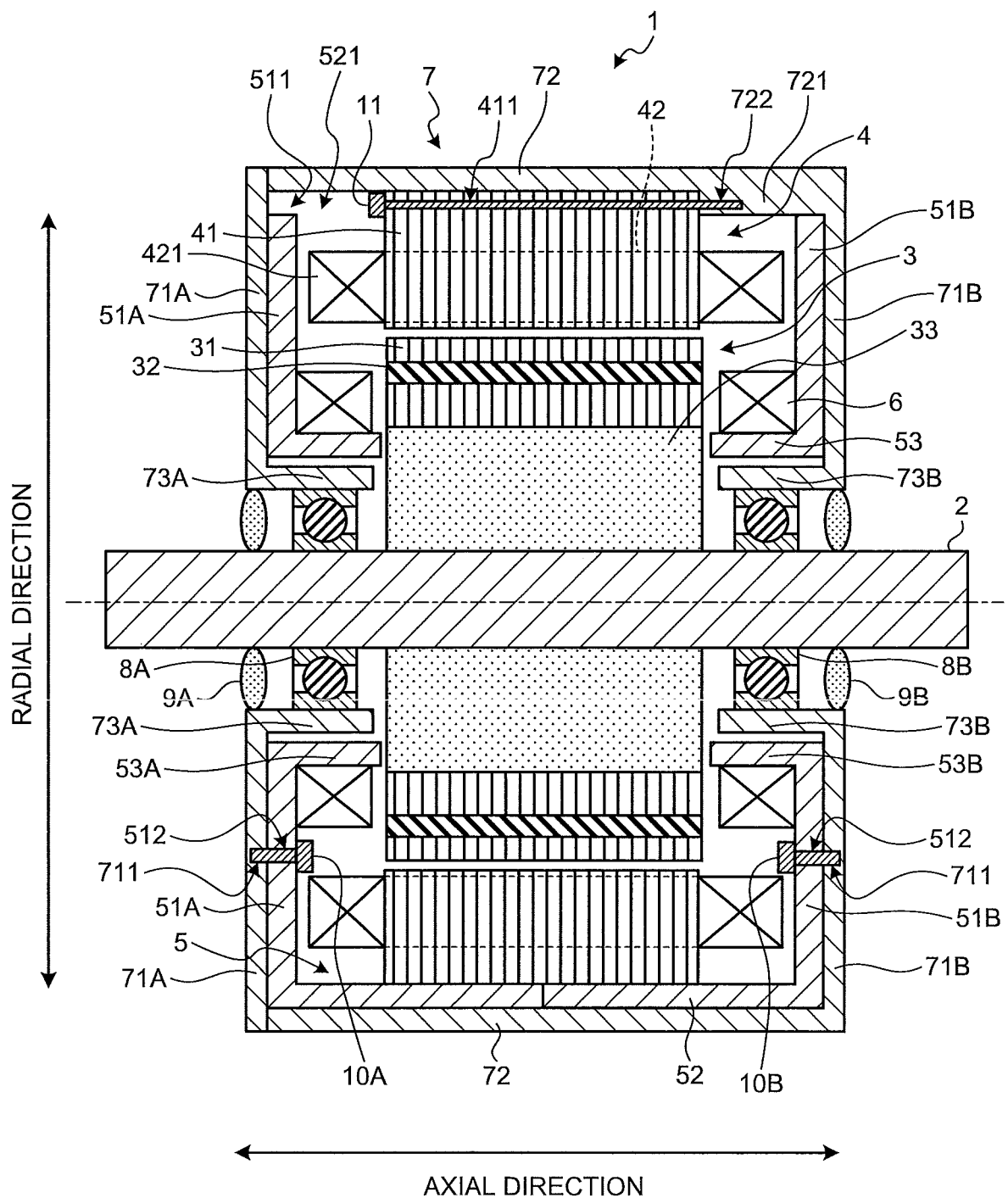
FIG. 1 is a cross-sectional view of an electric motor according to a first embodiment.

FIG. 1 is a cross-sectional view of an electric motor 1 according to a first embodiment. As illustrated in FIG. 1, the electric motor 1 according to the first embodiment includes a shaft 2, a rotor 3, a stator 4, a field yoke 5, a field coil 6, and a case 7.

The shaft 2 is a metallic rotary shaft member elongated in the axial direction. Note that the "axial direction" in the following descriptions is defined to be the axial direction (longitudinal direction) of the shaft 2. The rotor 3 includes a rotor core 31, a magnet 32, and a field core 33. The rotor core 31 is formed in a cylindrical shape by laminating a plurality of electromagnetic steel sheets in the axial direction of the shaft 2. In the rotor core 31, there is a gap between the electromagnetic steel sheets in the axial direction, whereby the magnetoresistance in the axial direction is greater than the magnetoresistance in the circumferential direction and the radial direction which are orthogonal to the axial direction of the rotor core 31. Therefore, in the rotor core 31, a magnetic flux hardly flows in the axial direction, and the magnetic flux easily flows in the radial direction and the circumferential direction.

The magnet 32 is embedded in the rotor core 31, and extends in the axial direction of the rotor core 31. Both axial end surfaces of the magnet 32 in the axial direction are substantially flush with respective axial end surfaces of the rotor core 31. Four magnets 32 are disposed at intervals by 90 degrees in the circumferential direction of the rotor core 31.

The field core 33 is formed to be a cylindrical shape by a magnetic material, provided on the inner periphery of the rotor core 31, and fixed to the shaft 2 so as to be rotatable together with the shaft 2. Both axial end surfaces of the field core 33 are substantially flush with respective axial end surfaces of the rotor core 31. The magnetoresistance of the field core 33 in the axial direction is less than the magnetoresistance of the rotor core 31 in the axial direction. Therefore, in the field core 33, the magnetic flux flows in the axial direction more easily than in the rotor core 31.

The stator 4 includes a cylindrical stator core 41 disposed an outer side of the rotor core 31 in the radial direction by a predetermined interval, and a stator coil 42 wound around the stator core 41. The stator core 41 is formed by laminating a plurality of electromagnetic steel sheets in the axial direction. In the stator core 41, there is a gap between the electromagnetic steel sheets in the axial direction, whereby the magnetoresistance in the axial direction is greater than the magnetoresistance in the radial direction and the circumferential direction. Therefore, in the stator core 41, the magnetic flux hardly flows in the axial direction, and the magnetic flux easily flows in the radial direction and the circumferential direction.

The field yoke 5 is made of a magnetic material includes a pair of end wall portions 51A and 51B, an outer wall portion 52, and a pair of inner wall portions 53 (i.e., 53A and 53B), and involves the rotor 3 and the stator 4 as illustrated in FIG. 1. The pair of end wall portions 51A and 51B are annular, and are disposed at positions away from respective end portions of the rotor 3 and the stator 4 in the axial direction. The outer wall portion 52 extends in the axial direction to the outside of a coil end 421 of the stator 4, and is formed to be cylindrical and continuous with outer peripheral edge portions of the respective end wall portions 51A and 51B in the radial direction. The pair of inner wall portions 53A and 53B is formed to be cylindrical and continuous with inner peripheral edge portions of the respective end wall portions 51A and 51B in the radial direction, and is disposed at a predetermined interval from the respective end portions of the rotor 3 in the axial direction. Further, each of the inner wall portions 53A and 53B is disposed at a predetermined interval from the shaft 2 in the radial direction.

Figure 2:
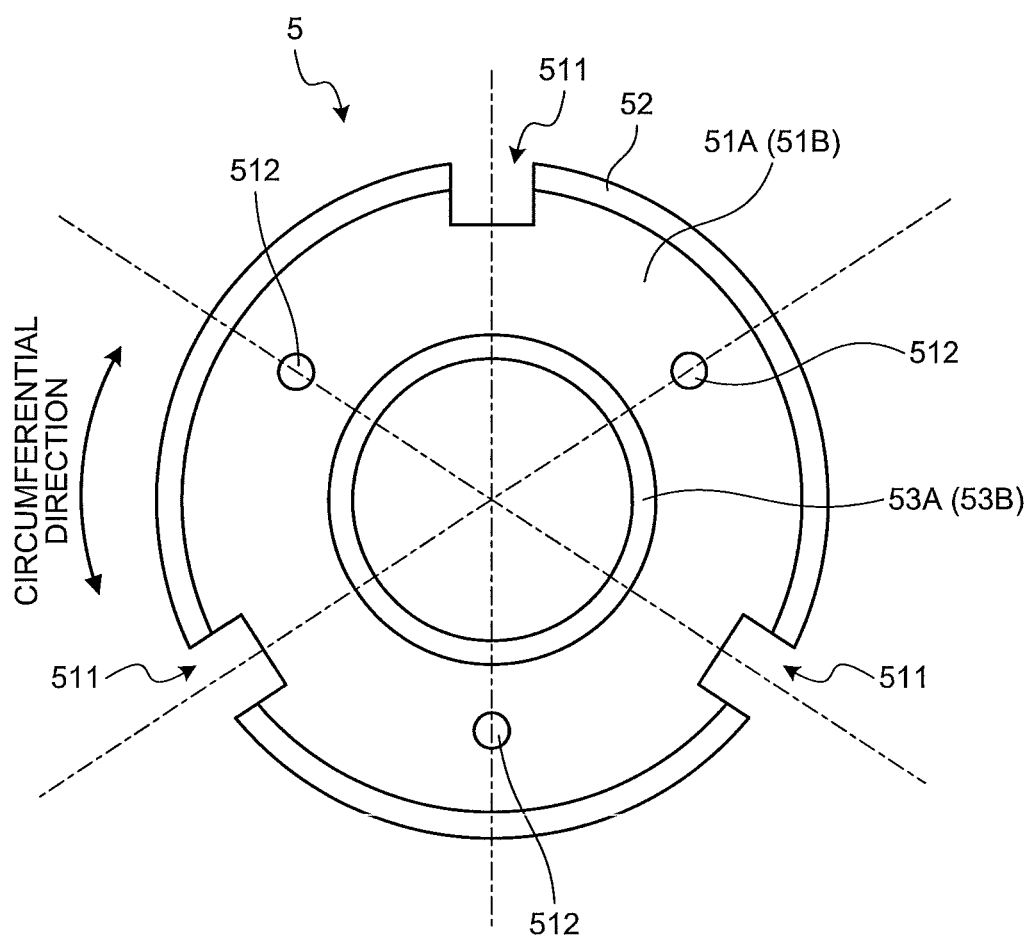
FIG. 2 is a view of a field yoke viewed in an axial direction.

FIG. 2 is a view of the field yoke 5 viewed in the axial direction. Three recessed cutout portions 511 are formed in the outer peripheral edge portion of each of the end wall portions 51A and 51B of the field yoke 5 in the radial direction at intervals of 120 degrees in the circumferential direction. In the pair of end wall portions 51A and 51B, the three cutout portions 511 formed in the end wall portion 51A and the three cutout portions 511 formed in the end wall portion 51B are positioned to overlap with each other in the circumferential direction viewed in the axial direction. An opening 521 (see FIG. 1) extending in the axial direction is formed in the outer wall portion 52 so that the cutout portions 511 of the pair of end wall portions 51A and 51B are connected to each other in the axial direction. Further, a through hole 512 is formed in each of the end wall portions 51A and 51B at a position shifted by 180 degrees from each of the cutout portions 511 in the circumferential direction.

Furthermore, the field coil 6 is provided on a surface of each of the end wall portions 51A and 51B on the side of the rotor 3 in the axial direction. The field coil 6 is capable of controlling an amount of the magnetic flux between the rotor core 31 and the stator core 41 by forming a magnetic circuit between the field yoke 5 and the rotor core 31.

As illustrated in FIG. 1, the case 7 includes a pair of end wall portions 71A and 71B, an outer wall portion 72, and a pair of inner wall portions 73A and 73B, and houses the rotor 3, the stator 4, and the field yoke 5 therein. The field yoke 5 is fixed to the case 7. The case 7 covers both axial end surfaces and the outer peripheral surface of the field yoke 5 so as to effectively protect the field yoke 5. However, an opening may be provided in a part of the case 7 so that the field yoke 5 is exposed to the outside. The pair of end wall portions 71A and 71B are annular, and is disposed to face each other such that the pair of end wall portions 51A and 51B of the field yoke 5 is sandwiched therebetween in the axial direction. At a position corresponding to, in each of the end wall portions 71A and 71B, the through hole 512 bored in each of the end wall portions 51A and 51B of the field yoke 5, a bolt hole 711 bored into which bolts 10A and 10B, which are fastening members, are inserted.

In the electric motor 1 according to the first embodiment, the outer wall portion 52 of the field yoke 5 is press-fitted to the inner periphery of the outer wall portion 72 of the case 7, and the outer wall portion 52 of the field yoke 5 is fixed to the outer wall portion 72 of the case 7. Accordingly, the outer wall portion 52 of the field yoke 5 is supported and reinforced by the outer wall portion 72 of the case 7. Moreover, in the electric motor 1 according to the first embodiment, the bolts 10A and 10B are inserted into the bolt holes 711 bored in the end wall portions 71A and 71B, respectively, of the case 7 and the through holes 512 bored in the end wall portions 51A and 51B of the field yoke 5, thereby bolting the end wall portions 51A and 51B of the field yoke 5 to the end wall portions 71A and 71B of the case 7. Accordingly, the end wall portions 51A and 51B of the field yoke 5 are supported and reinforced by the end wall portions 71A and 71B, respectively, of the case 7.

As a method of fixing the field yoke 5 to the case 7, any method of mechanical fixing, such as press fitting, bolting, shrink fitting, and swaging, may be used. Further, at the time of fixing the field yoke 5 to the case 7, it is preferable to use a positioning structure of the field yoke 5 to be positioned with respect to the case 7 by using a knock pin or the like.

The outer wall portion 72 is formed to be cylindrical continuous with the outer peripheral edge portion of each of the end wall portions 71A and 71B. At the position corresponding to the opening 521 formed in the outer wall portion 52 of the field yoke 5 on the inner periphery of the outer wall portion 72, there is provided a boss portion 721 that extends radially inward, one end thereof in the axial direction is continuing to the end wall portions 71A and 71B, and the other end thereof can contact with the stator core 41. A bolt hole 722 into which a bolt 11 is fitted is formed in the boss portion 721 in the axial direction at the position communicating with a through hole 411 made to penetrate the stator core 41 in the axial direction.

In the electric motor 1 according to the first embodiment, the stator core 41 is not fixed to the field yoke 5, and the stator core 41 is fixed to the case 7. In the electric motor 1 according to the first embodiment, the bolt 11 is inserted into the through hole 411 bored in the stator core 41 and the bolt hole 722 bored in the boss portion 721 of the case 7, thereby bolting the stator core 41 to the outer wall portion 72 of the case 7. Accordingly, the stator core 41 is directly fixed to the case 7 without an intervention of the field yoke 5, whereby a torque reaction force from the stator 4 during operation of the electric motor 1 is not directly applied to the field yoke 5. It is therefore possible to prevent a deformation of the field yoke 5 caused by the torque reaction force being directly applied to the field yoke 5. Furthermore, since the stator core 41 is directly fixed to the case 7 without an intervention of the field yoke 5, it is possible to prevent a deformation of the field yoke 5 due to a stress at the time of coupling which can be occurred in a case where, for example, the field yoke 5 and the stator 4 are directly fixed by press fitting.

The pair of inner wall portions 73A and 73B of the case 7 is formed to be cylindrical and continuous with inner peripheral edge portions of the respective end wall portions 71A and 71B in the radial direction, and is disposed at a predetermined interval from the respective end portions of the rotor 3 in the axial direction. The inner wall portions 73A and 73B is disposed at a predetermined interval in the radial direction with respect to the inner wall portions 53A and 53B, respectively, of the field yoke 5 and is disposed at a predetermined interval in the radial direction with respect to the shaft 2. At this time, the predetermined interval between the inner wall portions 73A and 73B and the shaft 2 is wider than the predetermined interval between the inner wall portions 73A and 73B and the inner wall portions 53A and 53B of the field yoke 5. Ball bearings 8A and 8B are provided on the inner peripheries of the inner wall portions 73A and 73B, respectively, so that the case 7 and the shaft 2, into which the ball bearings 8A and 8B are inserted, are made to be relatively rotatable by the ball bearings 8A and 8B. In addition, on the axially outer side of the ball bearings 8A and 8B, there are provided annular seal members 9A and 9B, respectively, into which the shaft 2 is inserted, which seals the spaces between the inner wall portions 73A and 73B and the shaft 2.

In the electric motor 1 according to the first embodiment, the case 7 is supported by the shaft 2 via the ball bearings 8A and 8B, whereby a radial force from the ball bearings 8A and 8B during an operation of the electric motor 1 is not directly applied to the field yoke 5. Therefore, it is possible to prevent a deformation of the field yoke 5 caused by the radial force from the ball bearings 8A and 8B which is directly applied to the field yoke 5.

As described above, in the electric motor 1 according to the first embodiment, it is possible to prevent a damage and a deformation of the field yoke 5 caused by a force which is directly applied to the field yoke 5. As a result, a reliability of the field yoke 5 is secured, and a deterioration due to a distortion of the field yoke 5 can be prevented. Furthermore, since a deformation of the field yoke 5 due to a force can be prevented, an insulation performance can be maintained. The gap dimension between the rotor core 31 and the field yoke 5 can be stabilized, and the field effect can be stabilized. Moreover, since the core of the stator 4 and the rotor 3 is exposed by the case 7, the gap dimension between the stator 4 and the rotor 3 can be stabilized, and a torque output from the electric motor 1 can be stabilized. In addition, since the stator 4 is fixed to the case 7 separately from the field yoke 5, the stator 4 can be easily assembled to the case 7.

In the first embodiment, a case of the inner rotor type electric motor 1, in which the rotor 3 is disposed radially inward of the stator 4, is described. However, it is also applied to an outer rotor type electric motor 1 in which the rotor 3 is disposed radially outward of the stator 4.

Second Embodiment

Next, an electric motor 1 according to a second embodiment of the present disclosure will be described. Note that, in the electric motor 1 according to the second embodiment, descriptions of portions common to those in the electric motor 1 according to the first embodiment will be omitted as appropriate.

Figure 3:
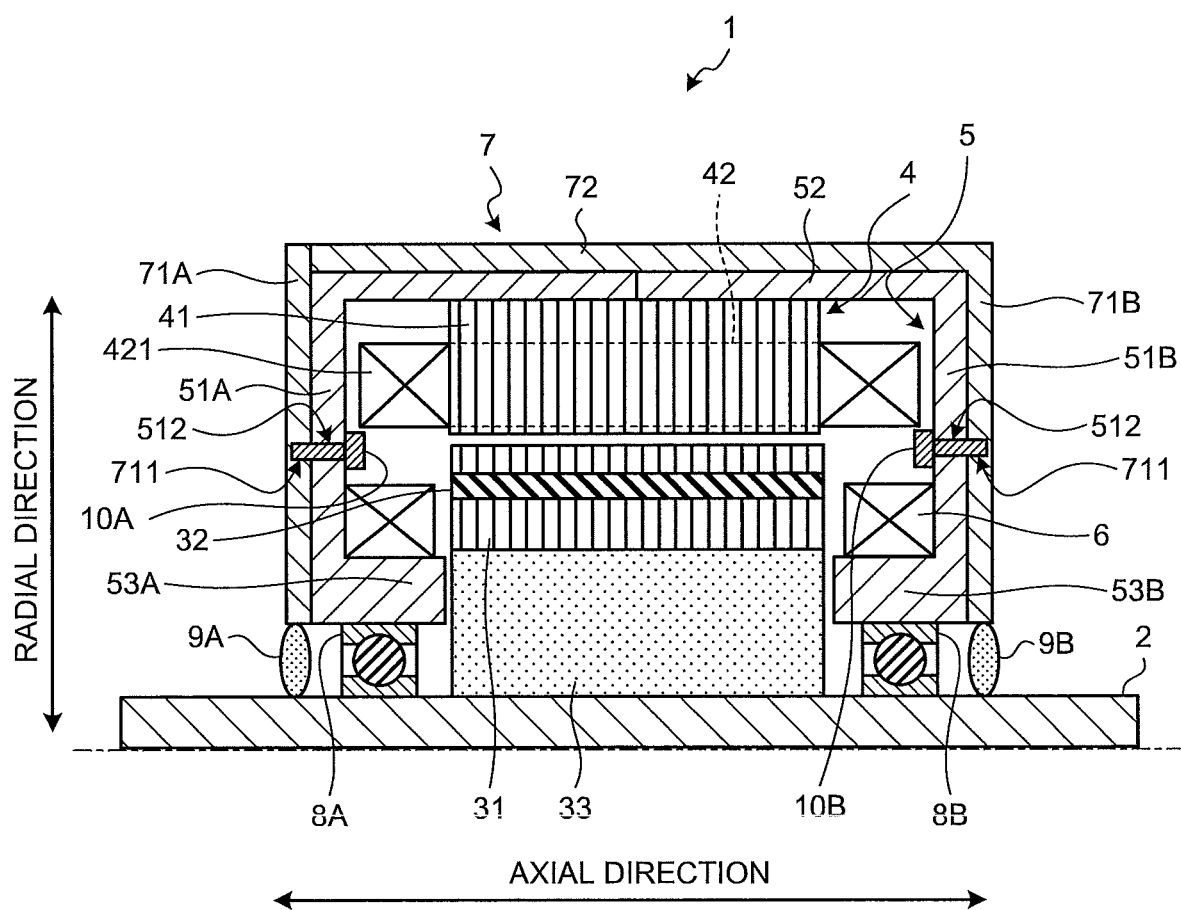
FIG. 3 is a cross-sectional view of an electric motor according to a second embodiment.

FIG. 3 is a cross-sectional view of the electric motor according to the second embodiment. Note that FIG. 3 illustrates a half part of the electric motor 1 in the radial direction with the axis of a shaft 2 serving as a boundary. In the electric motor 1 according to the second embodiment, a case 7, which is for housing a rotor 3, a stator 4, and a field yoke 5, includes a pair of annular end wall portions 71A and 71B and a cylindrical outer wall portion 72, and does not include inner wall portions 73A and 73B, which are included in the case 7 of the electric motor 1 according to the first embodiment. As illustrated in FIG. 3, in the electric motor 1 according to the second embodiment, ball bearings 8A and 8B are provided on the inner peripheries of inner wall portions 53A and 53B of the field yoke 5, respectively, and the ball bearings 8A and 8B are supported by the field yoke 5. Accordingly, a radial force from the ball bearings 8A and 8B is directly applied to the field yoke 5 during an operation of the electric motor 1.

Meanwhile, in the electric motor 1 according to the second embodiment, in a similar manner to the electric motor 1 according to the first embodiment, bolts 10A and 10B are inserted into bolt holes 711 bored in end wall portions 71A and 71B, respectively, of the case 7 and a through holes 512 bored in end wall portions 51A and 51B of the field yoke 5, thereby bolting the end wall portions 51A and 51B of the field yoke 5 to the end wall portions 71A and 71B of the case 7. Accordingly, the end wall portions 51A and 51B of the field yoke 5 are supported by the end wall portions 71A and 71B of the case 7, and the field yoke 5 is reinforced by the case 7. As a result, a deformation of the field yoke 5 can be prevented even when the radial force from the ball bearings 8A and 8B is directly applied to the field yoke 5 during an operation of the electric motor 1.

In the electric motor according to the present disclosure, the field yoke is fixed to the case member having the side wall portion, which extends in the axial direction and faces the outer peripheral surface of the field yoke, and the field yoke is reinforced by the case member. Accordingly, in the electric motor according to the present disclosure, even when a force is directly applied to the field yoke from the stator core on the radially outer side of the stator core, a deformation of the field yoke can be prevented.

According to an embodiment, it makes it possible to reinforce the field yoke with the side wall portion of the case member to prevent a deformation of the field yoke.

According to an embodiment, it makes it possible to reinforce the field yoke with the pair of end wall portions of the case member to prevent a deformation of the field yoke.

According to an embodiment, it makes it possible to fasten the field yoke and the pair of end wall portions with the fastening member, and to reinforce the field yoke with the end wall portion of the case member to prevent a deformation of the field yoke.

According to an embodiment, it makes it possible to prevent the force from the bearing in the radial direction from being directly applied to the field yoke, whereby a deformation of the field yoke can be prevented.

According to an embodiment, it makes it possible to prevent the force from the stator core being directly applied to the field yoke, whereby deformation of the field yoke can be prevented.

According to an embodiment, it makes it possible to prevent the force from the stator core from being directly applied to the field yoke, whereby a deformation of the field yoke can be prevented.

According to an embodiment, it makes it possible to effectively protect the field yoke with the case member.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electric motor comprising:
   a rotary shaft member configured to rotate about an axis;
   a rotor including a rotor core, which has an annular shape and is provided on the rotary shaft member, and a magnet provided on the rotor core;
   a stator including a stator core, which has an annular shape and is disposed at an interval from the rotor core in a radial direction that is a direction orthogonal to an axial direction of the rotary shaft member, and a stator coil wound around the stator core;
   a field yoke, which has an annular shape and has a fixed relative positional relationship with respect to the stator core; and
   a case member, which has a side wall extending in the axial direction to face an outer peripheral surface of the field yoke, wherein
   the field yoke includes a pair of end wall portions each continuous with a respective end of an outer wall portion and a respective one of a pair of inner wall portions,
   the field yoke is formed so as to partially surround the rotor and the stator,
   the field yoke is fixed to the case member,
   the field yoke includes gaps in a radially outer surface of the outer wall portion, each of the gaps extending circumferentially and parallel to the axis, and
   bolts connect the stator to the case member, each of the bolts extending parallel to the axis within a respective one of the gaps and radially interior to the case member.

2. The electric motor according to claim 1, wherein the side wall is cylindrical, and the field yoke is press-fitted to the side wall.

3. The electric motor according to claim 1, wherein
the case member includes a pair of case member end wall portions, which extend in the radial direction and face with each other in a manner that the field yoke is interposed between the pair of case member end wall portions in the axial direction, and
the field yoke is fixed to the pair of case member end wall portions.

4. The electric motor according to claim 3, further comprising: fastening members that fasten the field yoke to the pair of case member end wall portions.

5. The electric motor according to claim 3, wherein the case member is supported by the rotary shaft member via bearings.

6. The electric motor according to claim 1, wherein the case member covers both axial end surfaces and the outer peripheral surface in the axial direction of the field yoke.

\* \* \* \* \*